US006588458B2

(12) United States Patent
Rodgers

(10) Patent No.: US 6,588,458 B2
(45) Date of Patent: Jul. 8, 2003

(54) SYSTEM, APPARATUS AND METHOD FOR MEASURING AND TRANSFERRING THE CONTENTS OF A VESSEL

(75) Inventor: Donald B. Rodgers, Saugerties, NY (US)

(73) Assignee: Icon Dynamics, LLC, Rhinebeck, NY (US)

( * ) Notice: Subject to any disclaimer, the term of this patent is extended or adjusted under 35 U.S.C. 154(b) by 0 days.

(21) Appl. No.: 09/899,085

(22) Filed: Jul. 6, 2001

(65) Prior Publication Data

US 2003/0006245 A1 Jan. 9, 2003

(51) Int. Cl.[7] .................................................. B65B 1/04
(52) U.S. Cl. ............................. 141/9; 141/100; 141/94; 141/95; 141/83
(58) Field of Search ........................... 141/9, 100, 94, 141/95, 192, 198, 83; 261/131, 127

(56) References Cited

U.S. PATENT DOCUMENTS

| | | |
|---|---|---|
| 347,559 A | 8/1886 | Blessing |
| 699,249 A | 5/1902 | Sharples |
| 1,155,327 A | 9/1915 | Lee |
| 1,746,302 A | 2/1930 | Bronander |
| 2,691,386 A | 10/1954 | Madison ...................... 137/400 |
| 2,928,663 A | 3/1960 | Veres .......................... 261/70 |
| 3,044,482 A | 7/1962 | Golden ........................ 137/202 |
| 3,467,135 A | 9/1969 | Muskalla .................... 137/410 |
| 3,470,902 A | 10/1969 | Hackman ..................... 137/394 |
| 3,658,176 A | 4/1972 | Reid ............................ 206/65 |
| 3,837,527 A | 9/1974 | Kutik et al. .................. 220/72 |
| 3,983,702 A | * 10/1976 | Reid |
| 4,187,262 A | 2/1980 | Fessler et al. ................ 261/50 |
| 4,203,463 A | 5/1980 | Ponlot et al. ............... 137/403 |
| 4,235,829 A | 11/1980 | Partus ........................ 261/121 |
| 4,313,897 A | * 2/1982 | Garrard |
| 4,341,599 A | 7/1982 | Watson et al. |
| 4,353,523 A | 10/1982 | Palti ............................ 251/65 |
| 4,580,592 A | * 4/1986 | Clark et al. |
| 4,582,480 A | 4/1986 | Lynch et al. ................... 432/1 |

(List continued on next page.)

FOREIGN PATENT DOCUMENTS

| | | |
|---|---|---|
| DE | 59112 | 1/1913 |
| FR | 2166484 A | * 8/1973 |

*Primary Examiner*—David J. Walczak
*Assistant Examiner*—Khoa D. Huynh
(74) *Attorney, Agent, or Firm*—Pennie & Edmonds LLP

(57) ABSTRACT

The invention relates to a system, apparatus, and method for measuring and transferring the contents of a vessel. The apparatus includes an outer vessel having a liquid disposed therein and an inner vessel positioned to float in the liquid of the outer vessel. A liquid is also disposed in the inner vessel. An input passageway is associated with the inner vessel and at least one output passageway is associated with the outer vessel. A magnet or other sensed member is positioned on the inner vessel and a sensor, such as a Hall-effect sensor, is associated with the outer vessel. The sensor is configured so as to read the position of the inner vessel relative to the sensor to determine the weight of the inner vessel.

32 Claims, 6 Drawing Sheets

U.S. PATENT DOCUMENTS

| | | | |
|---|---|---|---|
| 4,589,282 A | 5/1986 | Dumery | 73/313 |
| 4,859,375 A | 8/1989 | Lipisko et al. | 261/20 |
| 4,964,531 A | 10/1990 | Caniglia et al. | 220/855 |
| 4,979,545 A | 12/1990 | Fair | 141/83 |
| 4,979,643 A | 12/1990 | Lipisko et al. | 222/83 |
| 5,016,198 A | 5/1991 | Schreiber | 364/550 |
| 5,038,840 A | 8/1991 | Fair | 141/83 |
| 5,176,167 A | 1/1993 | Tiao | 137/423 |
| 5,279,338 A | 1/1994 | Goossens | 141/95 |
| 5,440,887 A | 8/1995 | Nishizato et al. | 62/50.7 |
| 5,518,341 A | 5/1996 | Verret | 405/210 |
| 5,606,109 A | 2/1997 | Sisk et al. | 73/3 |
| 5,636,548 A | 6/1997 | Dunn et al. | 73/313 |
| 5,866,795 A | 2/1999 | Wang et al. | 73/1.36 |
| 5,880,364 A | 3/1999 | Dam | 73/149 |
| 5,921,428 A * | 7/1999 | Rodgers | |
| 5,938,985 A | 8/1999 | Rodgers | 261/131 |
| 5,972,117 A * | 10/1999 | Schmitt | |
| 6,019,114 A | 2/2000 | Rodgers | 137/2 |
| 6,067,855 A | 5/2000 | Brown et al. | 73/308 |

* cited by examiner

SYSTEM, APPARATUS AND METHOD FOR MEASURING AND TRANSFERRING THE CONTENTS OF A VESSEL

FIELD OF THE INVENTION

The present invention relates generally to an apparatus, system, and method for measuring and transferring the contents of a vessel. In particular, the system relates to a system where an inner vessel containing a fluid is suspended in an outer vessel containing a fluid. The amount of fluid contained in the inner vessel is determined based upon the weight or buoyancy of the inner vessel within the outer vessel. The apparatus utilizes a sensing mechanism to determine the weight of the vessel.

BACKGROUND OF THE INVENTION

Industries such as the semiconductor, fiber optics and pharmaceutical industries, among others, utilize processes which rely on highly accurate dispensation of materials, such as liquid or vapor chemicals. For instance, in the semiconductor industry, circuit manufacture involves numerous processing steps. Many of the processing steps involve the deposition of a material layer onto a semiconductor topography. These layers may be applied utilizing the deposition of a chemical vapor onto the surface of the semiconductor. Other film deposition techniques involve applying films by evaporation or sputtering. Chemical vapor deposition involves exposing the surface to gases, known as precursors, which undergo a chemical reaction to form a desired material on the surface.

Vapor deposition generally includes a liquid delivery or injection system for vaporizing a liquid chemical and carrying the vaporized liquid into the deposition process or reaction chamber for semiconductor processing. A typical liquid delivery process manages the flow of a liquid precursor or reagent, a carrier gas, and possibly one or more other gases. The liquid precursor is provided in a vaporization device and the carrier gas is delivered to the vaporization device for mixing with the vaporized liquid precursor.

The vapors or precursors are often produced in sealed containers, which have an input and output. The input carries gas into and near the bottom of the sealed container. The gas then bubbles up through the liquid. The gas combines with the liquid to form a vapor such that the upper portion of the sealed container is filled with the vapor. The output carries the vapor out of the sealed container for use in applying the material to a surface, such as a semiconductor surface.

Historically, volume measurement and flow control have been employed to achieve a desired dispensation volume or flow rate. Ever increasing demands driven by tighter delivery tolerances, material costs and waste management place greater demands on volume measurement methodologies. The volume of a given substance of otherwise constant mass can be influenced by temperature, pressure and dissolved gases. Dispensation device manufacturer's must employ highly advanced and costly measures to compensate for and/or minimize induced errors by such influences. For instance, the effect of dissolved gases is readily evident when viewed through the clear acrylic of conventional liquid micro-balances, where large bubbles accumulate on the inner wall of the float vessel. Manufacturers of precision metering systems must include a pre-dispense degassing operation, as well as tightly controlled fluid temperature and pressure.

There are numerous techniques for measuring the level of liquid in a vessel. Some common techniques for sensing liquid level include: 1) weighing the container, 2) determining a differential pressure, 3) utilizing a float, optical, or acoustic sensor, and 4) utilizing a capacitive proximity switch. These sensor technologies provide either switched or variable outputs, where switching sensors provide a single dry contact switch output, and variable sensors provide a voltage output, corresponding to the operating range of the sensor.

There are enumerable fluid handling and control applications that utilize a variety of sensor technologies to detect the presence, availability, and/or amount of a liquid. Most liquid delivery systems rely on a source, or buffer supply, of liquid. In many applications liquid level and flow control technologies are connected to the source vessel(s) to detect the availability, amount, and rate of liquid to be delivered from the vessel.

A common method of liquid measurement and control is to position a plurality of switching sensors at various elevations on a source vessel. Each sensor performs a switching function to control the operating state of the fluid handling system. For example, if a low liquid level sensor on the source vessel is switched, a valve may be actuated to refill the source vessel until the liquid level reaches a high liquid level sensor, which would, in turn, switch the refill valve to the closed position. In some cases, a pair of sensors may be utilized to supply a specific amount of liquid to a point of use, where the distance between the sensors corresponds to a volume of liquid. Although sensors can be repositioned to change the amount of liquid to be dispensed, the configuration does not lend itself well to applications that require variable amounts or rates of liquid delivery.

Another common method of liquid measurement and control is to place the vessel onto a load cell, appropriately sized to measure the weight of the vessel and its liquid contents. This method features variable signal output based on the weight of the liquid in the vessel at any liquid level. The signal output can be monitored by a controller, which in turn, can perform fluid control functions based on programmed signal set points. This measurement technique can provide real time measurement and control of the liquid contained in the vessel, and is widely used for automated liquid delivery. However, the range and sensitivity of the scale can affect its size, accuracy, and cost.

Another common measurement technique employs load cells (scales) to monitor mass transfer operations. In applications demanding repeatable accuracy, costly measures must be taken to control external influences, such as isolation from air currents, subtle vibrations, and interconnecting system transients.

Some types of sensors must be in direct contact with the liquid. Other types are positioned above the surface of the liquid. Still other sensors are positioned outside the vessel along the vertical axis of the fluid column height. Load cells are positioned underneath the liquid vessel. For most high purity liquid delivery applications, it is preferred that the sensors not be in contact with, or in the contained environment of the liquid being delivered.

Due to the various chemical characteristics or fluid dynamic conditions, some sensors may not be suitable for use. For example, optical sensors may be compromised by reflectivity of the liquid or deposits on the sensor tip. Acoustic sensors may be compromised by sound wave interference or distortion during the signal transmission. In fact, some liquid applications operate in a vacuum environment where sound waves will not travel. Capacitive sensors can "drift" from their calibrated electrical potential, and give false readings. Float sensors can fail mechanically and provide only fixed liquid level signals. Although these measurement and control techniques are very mature, they lack the ability to dynamically, and in real time, indicate liquid level and weight with a high degree of accuracy and repeatability.

Hall-effect sensors have been used to measure liquid levels. An example of such sensors is disclosed in U.S. Pat. No. 5,636,548. Buoyant vessel position monitoring has been used, as described in U.S. Pat. No. 5,606,109, for liquid volume deviation determinations. Prior devices teach volume measurement and compensation based on changes in temperature.

It is desirable to provide a system that provides improvements over prior art measurement techniques that are both efficient and cost effective.

SUMMARY OF THE INVENTION

The present invention relates to a fluid handling apparatus, a dispensing system, and a method for measuring and controlling the amount of fluid within a fluid handling apparatus. The fluid handling apparatus includes a containment vessel, a float vessel, and a sensor. The containment vessel has at least one inlet connected to a supply source for filling the containment vessel with a first material. The float vessel is disposed within the containment vessel and has at least one opening for receiving a second material. At least a portion of the second material is used for another purpose during operation of the fluid handling apparatus. The sensor is associated with the containment vessel for sensing the position of the float vessel within the containment vessel. The sensor is electronically connected to an indicator for transmitting a signal corresponding to a change in distance of the float vessel relative to the sensor and the change in distance is correlated with a weight of the float vessel.

In one embodiment, the indicator is a voltage indicator and the signal is voltage. The float vessel may include a magnet for interacting with the sensor to determine the position of the float vessel within the containment vessel. The sensor may be positioned substantially along a lower surface of the containment vessel and the sensed member may be a magnet. The magnet may be positioned inside a wall of the float vessel and the sensor is positioned inside a wall of the containment vessel such that the magnet and sensor are sealed from the first and second materials.

The fluid handling apparatus may include a centering device positioned inside the float vessel. The centering device may be used to maintain the float vessel substantially along a longitudinal axis of the containment vessel. In one embodiment, the containment vessel may be substantially sealed.

The fluid dispensing system includes a controller, an outer vessel, a float vessel, a sensor, and an input mechanism. The outer vessel holds a first fluid and the float vessel is positioned inside the outer vessel and holds a second fluid. The first and second fluids may be of the same type or different. The sensor is associated with the outer vessel and the controller is for monitoring a change in position of the float vessel within the outer vessel. A change in position is correlated with a weight of the second fluid within the float vessel. The input mechanism is associated with both the controller and a source for supplying a substance to the float vessel.

The substance may be a gas and the input mechanism may be a valve that is connected to a passageway, with the passageway positioned in the float vessel and having an end that is positioned beneath a surface of the second fluid to allow the gas to escape into the second fluid. The escaping gas becomes humidified as it passes through the second fluid and the system further comprises an outlet for the exit of the humidified gas.

A heat source may be positioned inside the float vessel and extend below the surface of the second liquid. An output is provided in the outer vessel and the second fluid vaporizes when in contact with the heating element. Vaporized fluid exits the outer vessel through the output.

Alternatively, or in addition thereto, the substance may be a second fluid that is periodically withdrawn from or replenished into the float vessel. The input mechanism may be a valve that is openable and closable to allow the second fluid to periodically flow into the float vessel, with operation of the valve being governed by the controller. The controller utilizes signals generated by the sensor in determining whether to open or close the valve. A weight of the second fluid is dynamically calculated based upon a sensed reading of the change in position of the float vessel within the outer vessel.

The float vessel may include a sensed member for interacting with the sensor in determining the position of the float vessel relative to the outer vessel. The sensed member may be a magnet and the sensor is connected to a voltage indicator to monitor the position of the magnet relative to the sensor. The sensor substantially simultaneously transmits a voltage to the controller that corresponds to the position of the magnet relative to the sensor. The controller determines, based upon this position, whether fluid should be input to the float vessel.

The outer vessel and float vessel include a head space positioned above the second fluid in the float vessel. The input mechanism includes a gas line positioned inside the head space, a gas source associated with the gas line, and a gas valve positioned along the gas line for starting and stopping the flow of gas from the gas source into the head space. The controller opens the gas valve to permit gas to fill the head space of the outer vessel and float vessel. The gas valve also permits gas to pressurize the head space.

The input mechanism may also include a fluid dispense line and a fluid supply valve. The fluid dispense line has an opening at one end, with the opening positioned below the surface of the second fluid in the float vessel and extending through the outer vessel at the other end. The fluid supply valve is opened by the controller to permit the second fluid to enter the float vessel and to close the fluid supply valve. During dispensing of the second fluid, the sensor monitors the position of the float vessel to determine when to close the fluid supply valve. When the sensor reads a low fluid level in the float vessel, the controller closes the gas valve and opens the fluid supply valve to dispense the second fluid into the float vessel. The second fluid may be dispensed into the float vessel from the fluid dispense line under pressure.

It is preferred that a useable volume of second fluid within the float vessel corresponds to a signal range of the sensor. The second fluid may include at least one fluid.

The method according to one embodiment of the invention is for measuring and controlling the amount of fluid within a fluid handling apparatus having a containment vessel and a float vessel. The float vessel is positioned inside the containment vessel. The method includes filling the containment vessel with a first fluid to cause the float vessel to float within the first fluid, filling the float vessel with a second fluid to create a usable volume of second fluid within the float vessel, measuring the change in position of the float vessel relative to a sensor in the containment vessel to determine when to fill and stop filling the float vessel with a second fluid, and performing an application to use at least a portion of the second fluid in the float vessel.

The method also may include refilling the float vessel with a second fluid to maintain a volume of second fluid based upon the measured position of the float vessel within the containment vessel. The sensor may read a distance between the sensor and the float vessel, with the signal from the sensor being an indicated voltage and the change in indicated voltage being calculated based upon the last reading. The method may also include converting the change in indicated voltage into a weight of the second fluid within the float vessel, wherein the weight of the second fluid is utilized to determine whether to input the second fluid into the float vessel.

In one embodiment, the method includes bubbling a gas through the second fluid in order to generate a humidified gas and dispensing the humidified gas through an outlet defined in the containment vessel. In another embodiment, the method includes heating the second liquid with a heating element in order to generate a vaporized liquid and dispensing the vaporized liquid through an outlet defined in the containment vessel.

BRIEF DESCRIPTION OF THE DRAWINGS

Preferred features of the present invention are disclosed in the accompanying drawings, wherein identical reference characters denote like elements throughout the several views, and wherein.

DETAILED DESCRIPTION OF THE INVENTIONS

Figure 1:
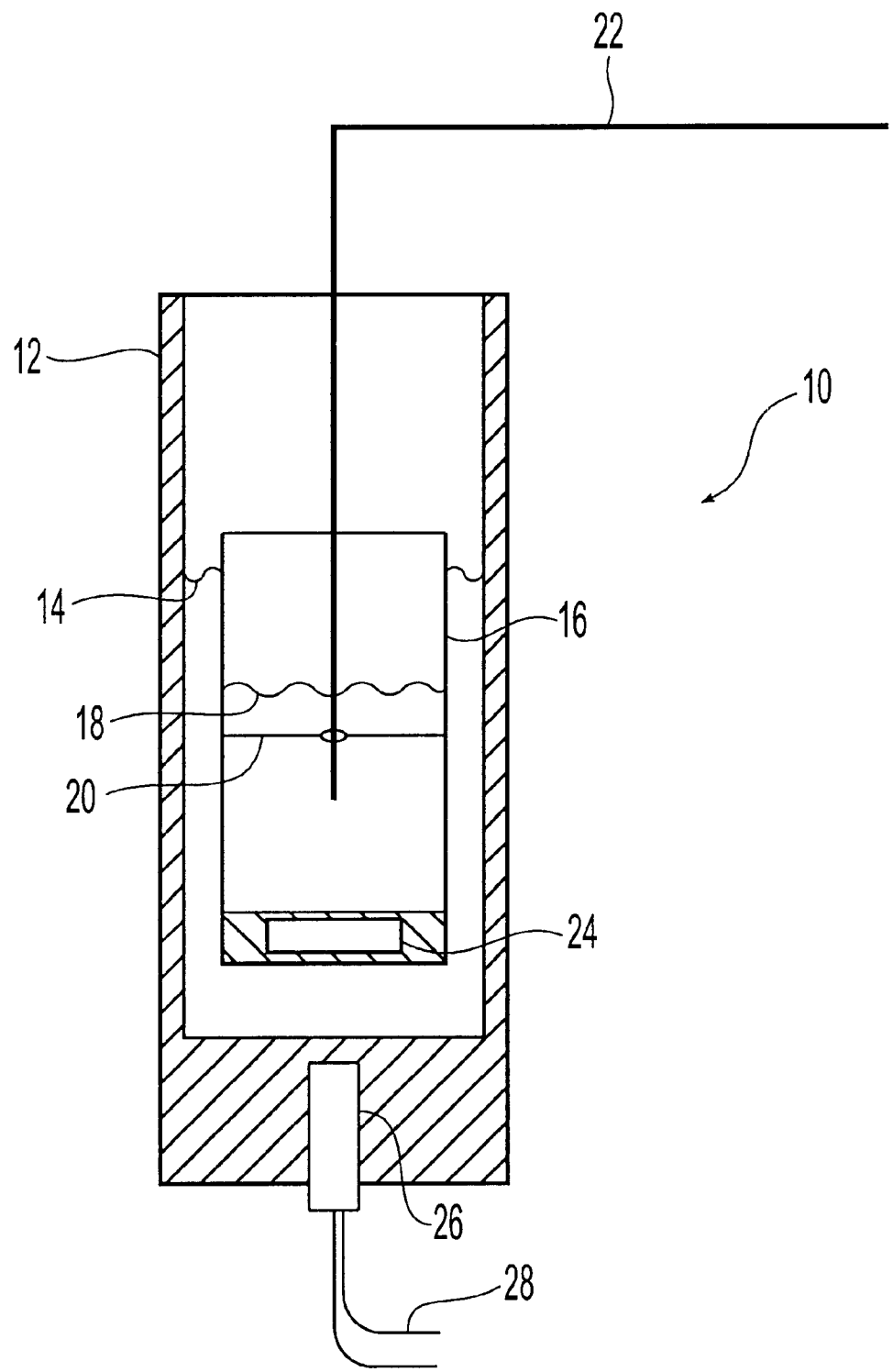
FIG. 1 is a schematic of the apparatus according to the invention.
Figure 2:
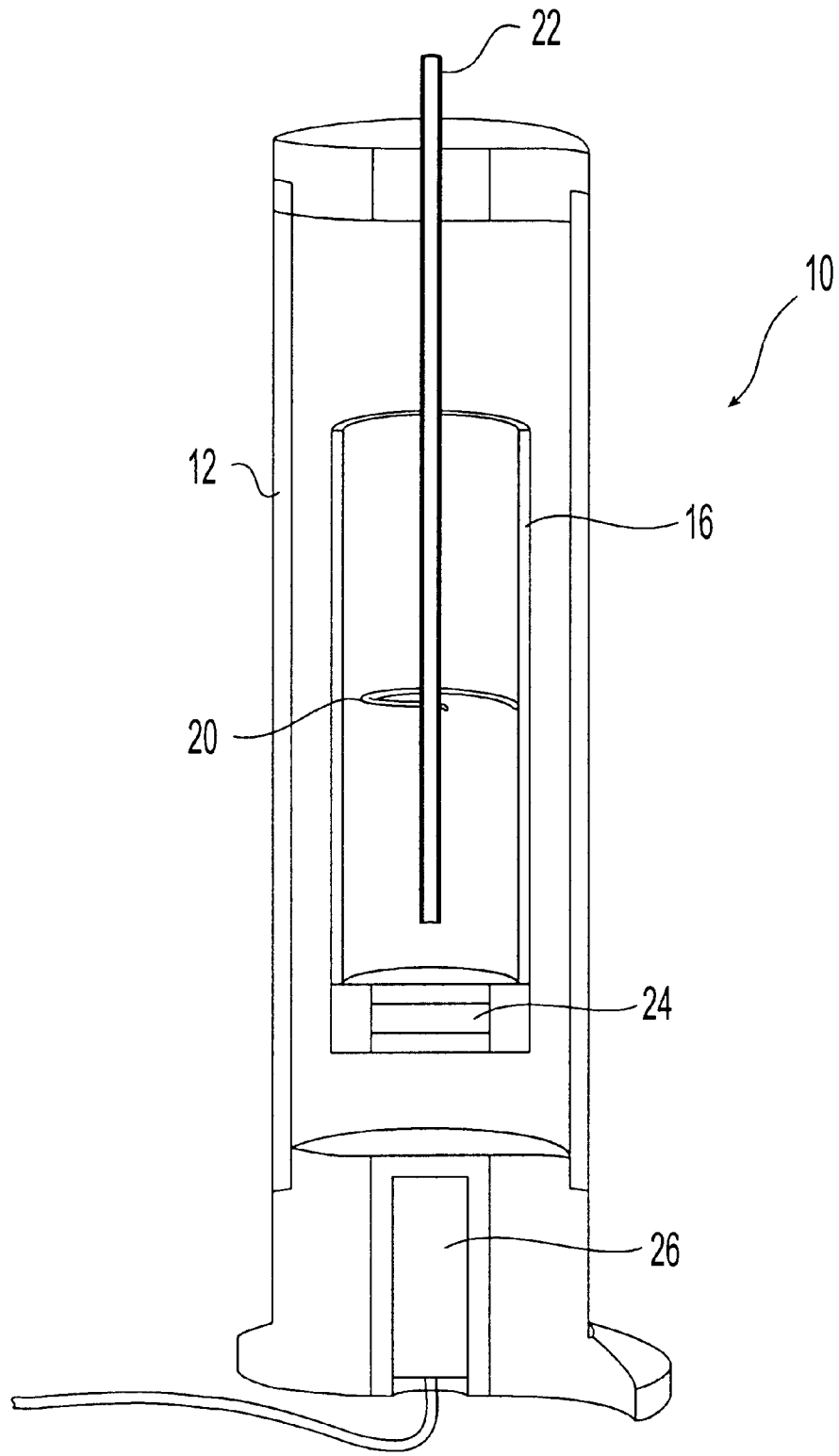
FIG. 2 is an isometric cut-away of the apparatus of FIG. 1.

The present invention relates to a system, apparatus, and method for measuring and transferring the contents of a container. An apparatus 10 according to the invention is shown in FIGS. 1 and 2. The apparatus 10 includes an outer vessel 12 having a material 14, such as a liquid, disposed therein and an inner buoy vessel 16 that floats in the outer vessel liquid 14. The inner buoy vessel 16 is also referred to as a float vessel and the outer vessel is also referred to as a containment vessel. A material 18, which may also be a liquid, is preferably disposed in the inner buoy vessel 16. The vertical position of inner buoy vessel 16 is a function of the combined weight of the buoy vessel 16 and the material 18 contained therein. The outer vessel 12 is preferably sealed, but may be open depending upon the application.

In one embodiment, inner buoy vessel 16 is substantially centered in outer vessel 12 by centering ring 20, which may be positioned around passageway conduit 22, or be entirely separate therefrom. It should be noted that while a centering device is preferred, it is not essential to the invention. Also, the type of centering device may be any type of device known by those of skill in the art.

The material 18 in inner buoy vessel 16 may be a single liquid, or a combination of liquids and gases, the invention not being limited to a single liquid. The material 14 in outer vessel 12 may also be a combination of liquids and/or gases.

Buoy vessel 16 carries a sensed member 24 which is sensed by a sensor 26. In one embodiment, the sensed member 24 is a magnet, such as a rare earth magnet, and the sensor is a linear Hall-effect sensor 26. The magnet 24 is positioned in a lower portion of inner buoy vessel 16, and is preferably sealed relative to the material 18 in inner buoy vessel 16 and the material 14 in outer vessel 12. The sensor 26 is positioned in a wall of the outer vessel 12, and, as shown, is preferably positioned in the bottom wall of outer vessel 12. Sensor 26 is positioned to interact with magnet 24, such that sensor 26 can read the position of magnet 24. Like sensed member 24, sensor 26 is also preferably shielded from exposure to the material 14 in outer vessel 12 and may be embedded in the wall of outer vessel 12.

Material introduced into or extracted from buoy vessel 16 through first passageway 22 changes the weight of the buoy vessel 16 and, thus, the vertical position of the inner buoy 16 and magnet 24 relative to the fixed position of the sensor 26. Sensor 26 reads the position of magnet 24 and generates an output value, analog signal, such as a voltage.

Figure 6:
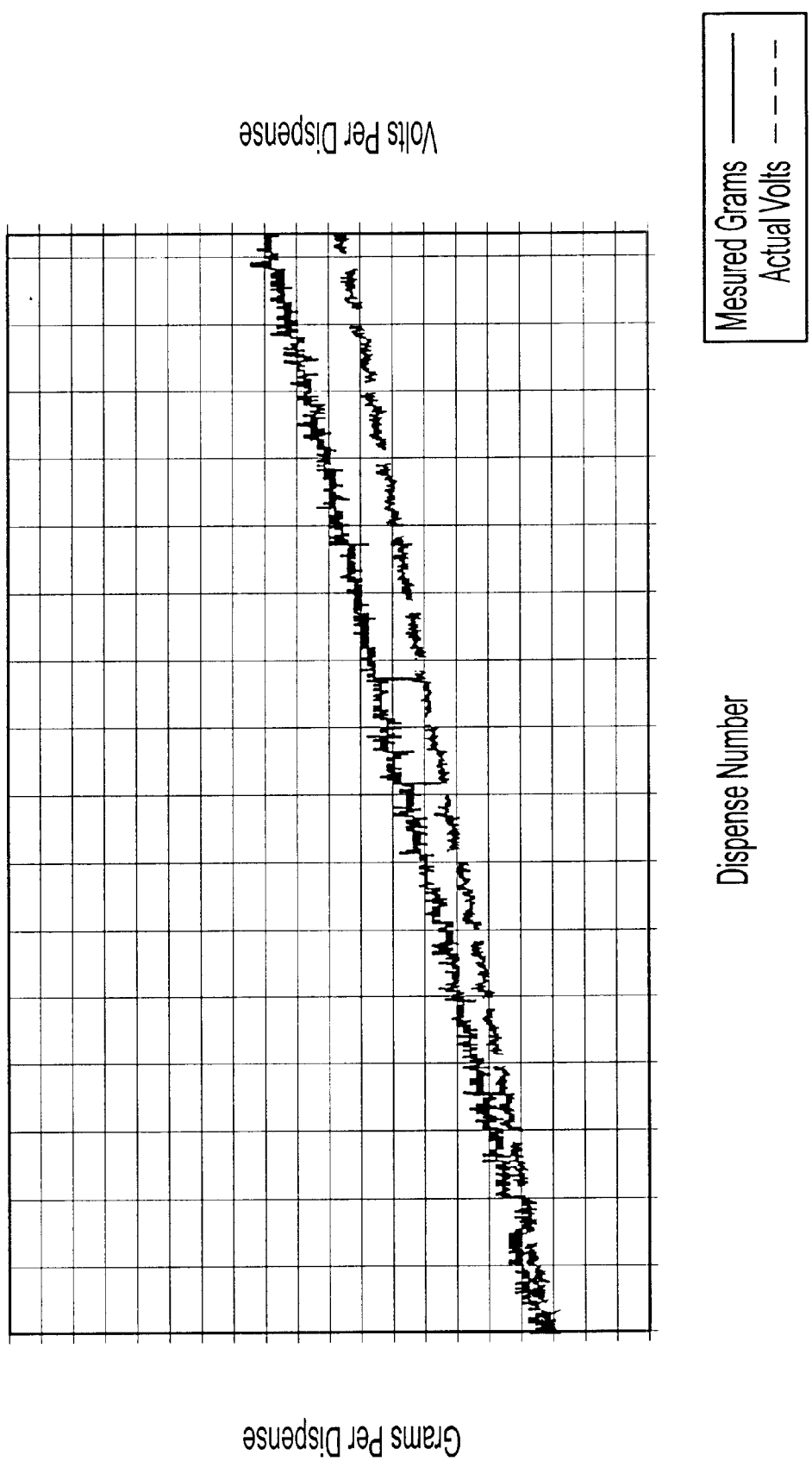
FIG. 6 is a graph showing the relationship between measured grams of fluid and actual voltage recorded for a given dispensation of material.

A Hall-effect sensor is one sensor that may be utilized with the invention. With hall-effect sensors, changes in the position of the magnet 24 relative to the sensor 26 creates a change in output voltage. This change in output voltage correlates to a measurement of the buoyant state of buoy vessel 16 and, thus, is a measurement of the weight change of buoy vessel 16. A correlation between weight and voltage may be generated for each apparatus such that the weight of the inner buoy vessel 16 may be known for each voltage generated by the sensor. An example of such a correlation is shown in FIG. 6. Thus, based upon how far away magnet 24 is from sensor 26, it is possible to determine the weight of the material 18 within inner buoy vessel 16.

A control system, in communication with the sensor's output 28, may be utilized to input material to buoy vessel 16 or to interrupt material transfer at a given voltage value. When applied to dispensing applications, the working volume 18 of float vessel 16 can be replenished as required by controlling the influx of makeup material to a target voltage value. In applications requiring weight based mixing of multiple constituents, each constituent can be introduced into the float vessel 16 based on a corresponding delta voltage value. The latter includes the addition of solid materials into a liquid to achieve a desired solution. Dip coating processes can be supported by controlling the parts extraction rate relative to float vessel 16 weight loss. Crystal growth rate may be monitored by suspending a seed in saturated liquid resident within the float vessel 16.

The invention overcomes influences on the repeatable accuracy of volume transfer control and load cell based devices by monitoring the buoyant state, i.e., the weight, of a float vessel suspended within a liquid volume contained within an outer vessel. As such the working vessel, which is a float vessel, is isolated within a closed system employing highly sensitive, non-contact, non-intrusive (external to the fluid environment), vertical position monitoring. The present invention monitors and dispenses material based on weight (mass transfer). Advantageously, because the vertical position of the inner vessel 16 is a function of its weight compared to the weight of the fluid volume 14 it displaces, volume changes in the inner vessel do not change its vertical position unless there is a change in weight. This provides a weight transfer measurement accuracy greater than methods which monitor changes in volume. In this way, the present invention overcomes conditions which alter the volume of a material of otherwise constant mass. Changes in density, which are affected by changes in temperature and/or pressure, do not impact the measurement accuracy of the present apparatus.

Figure 3:
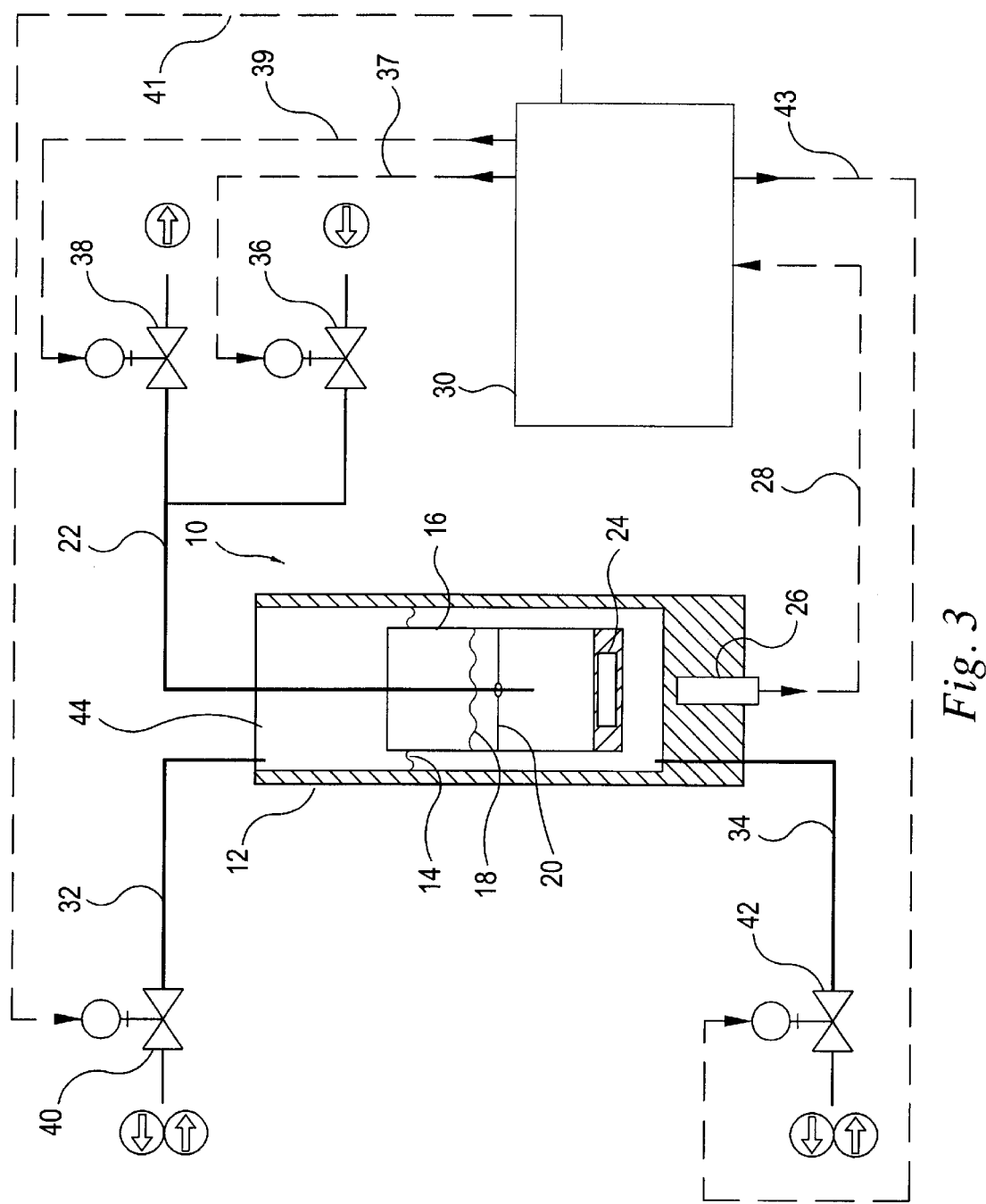
FIG. 3 is a schematic of the system according to the invention incorporating the apparatus of FIG. 1.

FIG. 3 depicts the apparatus of FIG. 1 in use in a system designed to transfer material. The system includes the apparatus 10, output signal line 28 of sensor 26, control module 30, various input and output passageways and corresponding valves, and signal lines. Output signal 28 can be monitored by control module 30 in order to perform such functions as filling, draining, pressurizing, and dispensing, to name a few. These functions may be automated with the use of the control module 30. The primary movement of material to and from the buoy vessel 16 is conducted through first passageway 22. Venting of or pressurizing outer vessel 12 is facilitated through second passageway 32. Draining or filling outer vessel liquid 14 is accomplished through third passageway 34. Flow control through the various passageways is controlled via valves 36, 38, 40, and 42. These valves are preferably automated isolation valves, which are controlled by the controller 30, although other types of valves may also be utilized.

Controller 30 monitors the output signal 28 from sensor 26 and controls the status of each of the flow control components, or valves 36, 38, 40, and 42, as required to affect a desired outcome. Each of the valves is associated with the controller via a signal line 37, 39, 41, and 43. Signal lines 37, 39, 41, and 43 are used to communicate with valves 36, 38, 40, and 42, respectively, to open and close the valves at a desired time.

FIG. 3 shows one example of a variety of systems and processes which may successfully utilize the apparatus of the invention. Many industrial applications require extremely accurate and frequent measure shots, such as one (1) gram dispensed shots of hazardous liquid chemicals. Utilizing the system of FIG. 3, in an otherwise dry state, the outer vessel 12 receives liquid 14 through third passageway 34 as controller 30 opens valve 42. Inner buoy vessel 16 begins to rise as liquid 14 column height exceeds the displacement volume of the buoy vessel 16. As buoy vessel 16 ascends, sensor 26 output voltage falls. Controller 30 monitors signal 28 and closes valve 42 at the appropriate voltage value. Controller 30 opens valve 36 and begins to introduce liquid 18 into buoy vessel 16 through first passageway 22. Buoy vessel 16 descends as the weight of liquid 18 increases. Voltage output 28 from sensor 26 increases as magnet 24 magnetic flux field increases. Controller 30 interrupts the influx of liquid by closing valve 36 when the accumulated weight of liquid 18 contained within buoy vessel 16 reaches a desired value. Pressure may be employed to dispense liquid. Controller 30 introduces a pressure regulated source of gas through second passageway 32 into the head space 44 of vessel 12 by opening valve 40 and thereby exerts a desired ballast on liquid 18. Other dispensing mechanisms may also be used with the invention, such as suction, gravity, capillary, and vaporization.

By means of example, a process dispense request for one (1) gram is received by controller 30. Controller 30, having been pre-configured with the appropriate algorithms, calculates the voltage reduction associated with a vertical accent of buoy vessel 16 after losing one (1) gram. Controller 30 closes valve 38 at the desired voltage value. By design, the working volume of buoy vessel 16 must be optimized for the desired degree of vertical resolution. In this example, the maximum liquid volume 18 introduced into buoy vessel 16 is twenty (20) grams which corresponds to a sensor 26 output value 28 of 3.5 volts. By design, the vertical distance that buoy vessel 16 ascends during a one (1) gram dispense is equal to 0.10 volts. This supports up to 20 one (1) gram dispenses before the controller 30 initiates a buoy vessel 16 refill.

Figure 4:
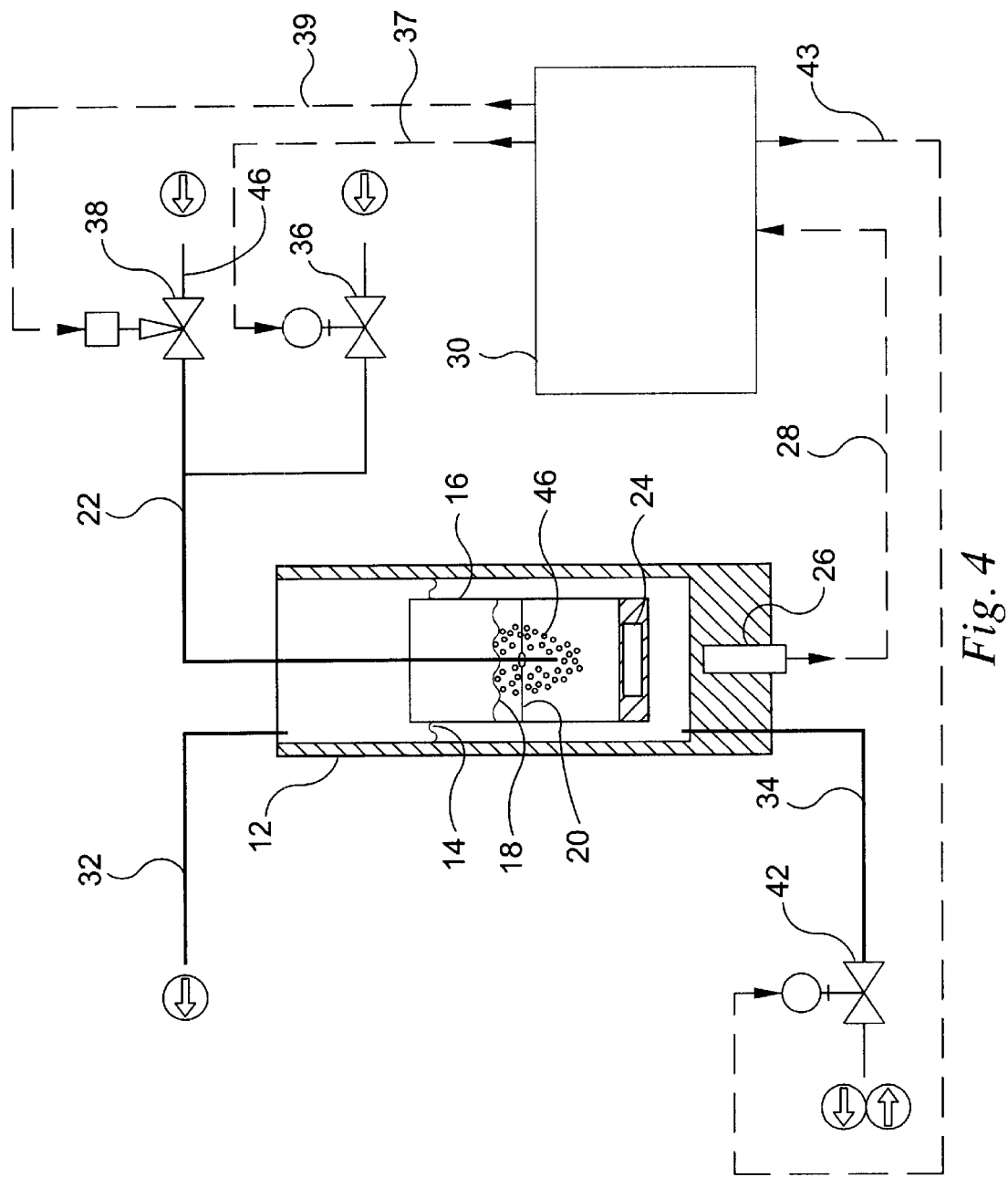
FIG. 4 is a schematic of the system showing the generation and transfer of a humidified gas.

Another type of operation that can utilize the apparatus and system of the present invention involves processes where a highly accurate mixture of material is required, such as shown in FIG. 4. In this application, each constituent may be sequentially introduced, based on a desired weight ratio, into buoy vessel 16 for subsequent batch dispensation. By design, the full volume of the compound is dispensed as buoy vessel 16 ascends up to and meets the effluent opening of first passageway 22.

FIG. 4 depicts a system that generates and transfers a humidified gas. The system is similar to the system depicted in FIG. 3. A gas supply 46 is associated with first passageway 22 and is metered therein by servo valve 38 under the instruction of control module 30. Controlled gas stream 46 is released at the lower end of first passageway 22 and bubbles up through liquid 18. Gas stream 46 becomes humidified during contact with liquid 18. As humidified gas, liquid entrained in the gas in the form of vapor exits the surface of liquid 18 and a corresponding weight loss is detected by sensor 26. This weight loss is communicated to control module 30. Control module 30 governs the flow rate of gas 46 introduced through servo valve 38 as a function of desired verses actual (preset) weight loss per unit time from buoy vessel 16 (as shown, for example, in FIG. 6). The humidified gas stream is deployed from the invention through second passageway 32 to a point of desired use. Periodic replenishment of inner buoy vessel 16 liquid 18 is accomplished during idle vapor delivery periods. Alternatively, a passageway (not shown) may be provided to automatically replenish liquid 18 upon command from controller 30. Advantageously, the system is substantially immune to influences caused by dissolved gases in liquid 18. Even if the percentage of dissolved gases reaches 50%, such that volume increases accordingly, the impact on weight will be negligible. 10% dissolved gases is not uncommon, particularly when a pneumatic ballast is used to pressurize a makeup supply source.

Figure 5:
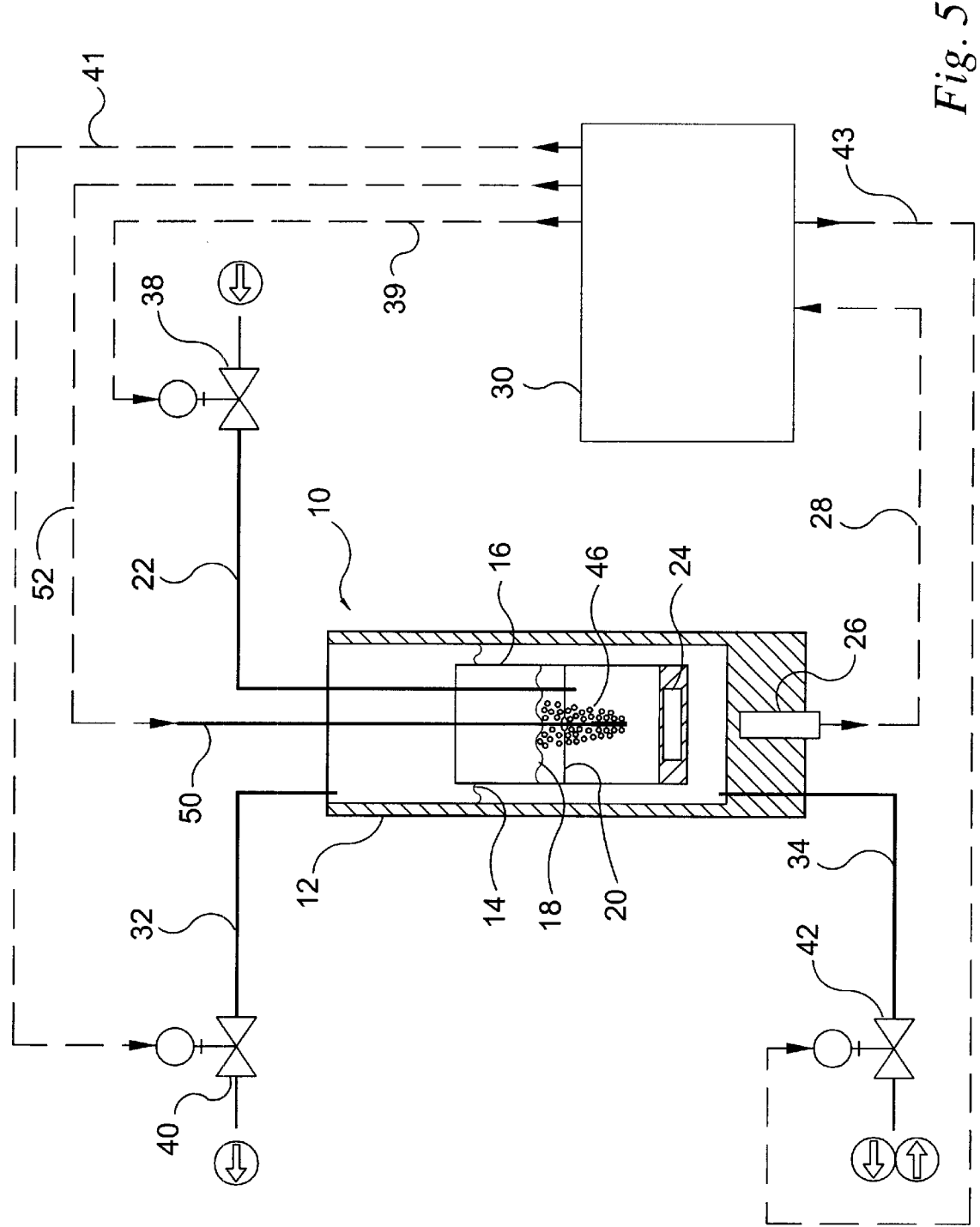
FIG. 5 is a schematic of the system showing the generation and delivery of a vaporized liquid.

Another example, FIG. 5 depicts the system utilized to generate and deliver a vaporized liquid. As with the above examples, the weight of liquid 18 in inner buoy vessel 16 determines the vertical position of the inner buoy vessel 16. A heat source 50 is preferably in contact with liquid 18. Localized phase change 48 is affected at the interface of the heat source liquid boundary. Sensor 26 monitors and communicates the rate of buoy vessel 16 weight loss to control module 30. Control module 30 is in communication with heat source 50 via conduit 52, or similar connection mechanism. Controller 30 varies the amount of thermal energy as a function of desired verses actual (preset) weight loss per unit time from buoy vessel 16. The localized phase change 48 produces a volume of vapor which exits through second passageway 32 to a point of desired use. Periodic replenishment of inner buoy vessel 16 liquid 18 is accomplished during idle vapor delivery periods. Alternatively, a passageway (not shown) may be provided to automatically replenish liquid 18 upon command from controller 30.

As shown, the inner 16 and outer 12 vessels are substantially cylindrical. However, the shape of the vessels is not critical to the invention. Other shapes may also be utilized, such as square, rectangular, conical, spherical, and other shapes. Importantly, the present invention provides a cost efficient and reliable liquid measurement and control system that precisely measures, in real time, the amount of liquid contained in a buoyant vessel. The invention also provides a mechanism for controlling the amount of liquid to be added to or removed from the buoyant vessel for purposes of automated liquid refill and dispensation applications.

While various descriptions, embodiments, and aspects of the present inventions are described above, it should be understood that the various features can be used singly or in any combination thereof. Each of the separate embodiments of the Figures may be used in conjunction with or side-by-side with the other embodiments. Therefore, this invention is not to be limited to only the specifically preferred embodiments depicted herein.

Further, it should be understood that variations and modifications within the spirit and scope of the invention may occur to those skilled in the art to which the invention pertains. Accordingly, all expedient modifications readily attainable by one versed in the art from the disclosure set forth herein that are within the scope and spirit of the present invention are to be included as further embodiments of the present invention.

What is claimed is:

1. A fluid handling apparatus comprising:
    a containment vessel having at least one inlet connected to a supply source for filling the containment vessel with a first material;
    a float vessel disposed within the containment vessel, said float vessel having at least one opening for receiving a second material, with at least a portion of the second material being used for another purpose during operation of the fluid handling apparatus; and
    a sensor associated with the containment vessel for sensing a position of the float vessel within the containment vessel, wherein the sensor transmits an electrical signal corresponding to a change in distance of the float vessel relative to the sensor and the change in distance is correlated with a change in weight of the second material in the float vessel.

2. The fluid handling apparatus of claim 1, wherein the signal is voltage.

3. The fluid handling apparatus of claim 1, wherein the float vessel further comprises a magnet for interacting with the sensor to determine the position of the float vessel within the containment vessel.

4. The fluid handling apparatus of claim 1, wherein the sensor is positioned substantially associated with a lower surface of the containment vessel.

5. The fluid handling apparatus of claim 4, wherein the float vessel further comprises an associated sensed member for interacting with the sensor in determining the position of the float vessel within the containment vessel, said sensed member being positioned substantially associated with a lower surface of the float vessel.

6. The fluid handling apparatus of claim 5, wherein the sensed member is a magnet.

7. The fluid handling apparatus of claim 6, wherein the magnet is positioned inside a wall of the float vessel and the sensor is positioned inside a wall of the containment vessel such that the magnet and sensor are sealed from the first and second materials.

8. The fluid handling apparatus of claim 1, wherein the containment vessel is substantially sealed.

9. The fluid handling apparatus of claim 1, wherein the first material is a liquid and the second material is a liquid.

10. The fluid handling apparatus of claim 1, further comprising a centering device positioned inside the float vessel, said centering device for maintaining the float vessel substantially aligned along a longitudinal axis of the containment vessel.

11. A dispensing system comprising:
    a controller;
    an outer vessel for holding a first fluid;
    a float vessel positioned inside the outer vessel for holding a second fluid;
    an output mechanism in communication with the second vessel;
    a sensor associated with the outer vessel and which supplies a signal to the controller,
    wherein said signal represents a change in position of the float vessel within the outer vessel, and wherein said change in position correlates to a change in weight of the second fluid within the float vessel; and
    an output mechanism associated with the controller and a source for supplying the second fluid to the float vessel.

12. The dispensing system of claim 11, further comprising a second input mechanism having a valve that supplies a gas through a passageway positioned beneath a surface of the second fluid.

13. The dispensing system of claim 12, wherein the escaping gas becomes humidified as it passes through the second fluid and the system further comprises an output for the exit of humidified gas.

14. The dispensing system of claim 11, wherein the second fluid is periodically withdrawn from or replenished into the float vessel.

15. The dispensing system of claim 11, wherein the input mechanism is a valve that is openable and closable to allow the second fluid to periodically flow into the float vessel, with operation of the valve being governed by the controller.

16. The dispensing system of claim 15, wherein the controller utilizes signals generated by the sensor in determining whether to open or close the valve.

17. The dispensing system of claim 11, wherein the weight of the second fluid is dynamically calculated based upon a sensed reading of the change in position of the float vessel within the outer vessel.

18. The dispensing system of claim 11, wherein the float vessel includes a sensed member for interacting with the sensor in determining the position of the float vessel relative to the outer vessel.

19. The dispensing system of claim 18, wherein the sensed member is a magnet, and the sensor is connected to a voltage indicator and monitors the position of the magnet relative to the sensor, the sensor substantially simultaneously transmits a voltage to the controller that corresponds to the position of the magnet relative to the sensor, and the controller determines, based upon this position, whether fluid should be input to the float vessel.

20. The dispensing system of claim 11, wherein the outer vessel and float vessel include a head space positioned above the second fluid in the float vessel, the system further comprising:
    a gas line positioned inside the head space;
    a gas source associated with the gas line; and
    a gas valve positioned along the gas line for starting and stopping the flow of gas from the gas source into the head space, wherein the controller opens the gas valve to permit gas to fill the head space of the outer vessel and float vessel.

21. The dispensing system of claim 20, wherein the gas valve further permits gas to pressurize the head space.

22. The dispensing system of claim 20, the output mechanism further comprising:
- a fluid dispense line having an opening at one end, with the opening positioned below the surface of the second fluid in the float vessel, and extending through the outer vessel at the other end; and
- a fluid supply valve, wherein the controller opens the fluid supply valve to dispense the second fluid from the float vessel and closes the fluid supply valve, wherein during dispensing of the second fluid, the sensor monitors the position of the float vessel to determine when to close the fluid supply valve.

23. The dispensing system of claim 22, wherein the occurrence of the sensor reading a low fluid level in the float vessel results in the controller closing the gas valve and using the input mechanism to supply the second fluid into the float vessel.

24. The dispensing system of claim 23, wherein the second fluid is dispensed into the float vessel from the input mechanism under pressure.

25. The dispensing system of claim 11, wherein a usable volume of second fluid within the float vessel corresponds to a signal range of the sensor.

26. The dispensing system of claim 11, wherein the second fluid comprises at least one fluid.

27. A method for measuring and controlling the amount of a material within an apparatus having a containment vessel and a float vessel, with the float vessel being positioned inside the containment vessel, comprising:
- filling the containment vessel with a first fluid to cause the float vessel to float within the first fluid;
- filling the float vessel with a second material to create a usable and measurable amount of second material within the float vessel;
- performing an application to use at least a portion of the second material in the float vessel; and
- measuring a change in position of the float vessel relative to a sensor associated with the containment vessel to determine a measured position representing the remaining amount of second material in the float vessel.

28. The method of claim 27, further comprising:
- refilling the float vessel with the second material to maintain a weight of second material based upon the measured position of the float vessel within the containment vessel.

29. The method of claim 27, wherein the sensor reads a distance between the sensor and the float vessel, with the signal from the sensor being an indicated voltage, and the change in indicated voltage is calculated based upon a prior reading.

30. The method of claim 29, further comprising using the calculated change in indicated voltage to determine the weight of the second material within the float vessel.

31. The method of claim 27, wherein the second material is a liquid.

32. The method of claim 31, wherein the step of performing an application to use at least a measured portion of the liquid includes at least bubbling a gas through the liquid in order to generate a humidified gas and dispensing the humidified gas through an outlet defined in the containment vessel.

* * * * *

UNITED STATES PATENT AND TRADEMARK OFFICE
CERTIFICATE OF CORRECTION

PATENT NO. : 6,588,458 B2  Page 1 of 1
DATED : October 16, 2003
INVENTOR(S) : Rodgers It is certified that error appears in the above-identified patent and that said Letters Patent is hereby corrected as shown below:

Column 10,
Line 14, change "vessel" to -- fluid --
Line 21, change "output" to -- input --

Signed and Sealed this

Twentieth Day of January, 2004

JON W. DUDAS
*Acting Director of the United States Patent and Trademark Office*